US006585212B2

(12) United States Patent
Carnevali

(10) Patent No.: US 6,585,212 B2
(45) Date of Patent: Jul. 1, 2003

(54) QUICK RELEASE ELECTRONICS PLATFORM

(76) Inventor: Jeffrey D. Carnevali, 3262 - 36 Ave. SW., Seattle, WA (US) 98126

(*) Notice: Subject to any disclaimer, the term of this patent is extended or adjusted under 35 U.S.C. 154(b) by 0 days.

(21) Appl. No.: 09/933,171

(22) Filed: Aug. 20, 2001

(65) Prior Publication Data

US 2003/0034429 A1 Feb. 20, 2003

(51) Int. Cl.⁷ .............................. A47B 81/00; H05K 7/14
(52) U.S. Cl. .............................. 248/346.07; 248/346.04; 248/316.4; 248/918; 361/727; 312/223.2; 312/319.1
(58) Field of Search ...................... 108/40, 44, 55.1, 108/55.3, 64, 65; 312/223.2, 319.1, 332.1; 361/725, 726, 727; 248/176.1, 178.1, 179.1, 181.1, 917, 918, 919, 920, 921, 922, 923, 510, 346.04, 346.07, 346.3, 346.5

(56) References Cited

U.S. PATENT DOCUMENTS

| | | | | |
|---|---|---|---|---|
| 1,670,970 A | * | 5/1928 | Laverdiere | 24/338 |
| 1,684,925 A | * | 9/1928 | Perlmutter | 248/346.07 |
| 2,653,330 A | * | 9/1953 | Nolan | 248/231.41 |
| 2,733,492 A | * | 2/1956 | Copell | 24/336 |
| 3,581,424 A | * | 6/1971 | Bloom | 43/25 |
| 3,669,392 A | * | 6/1972 | Saunders | 248/121 |
| 4,066,231 A | | 1/1978 | Bahner et al. | 248/13 |
| 4,118,003 A | * | 10/1978 | Dillow | 248/231.41 |
| 4,798,294 A | * | 1/1989 | Bodi | 108/55.3 |
| 4,802,708 A | * | 2/1989 | Vos et al. | 114/363 |
| 4,844,387 A | * | 7/1989 | Sorgi et al. | 108/5 |
| 4,909,159 A | * | 3/1990 | Gonsoulin | 108/143 |
| 4,957,264 A | * | 9/1990 | Hakanen | 248/510 |
| 5,024,408 A | * | 6/1991 | Magee | 211/34 |
| 5,149,032 A | * | 9/1992 | Jones et al. | 248/154 |
| 5,612,509 A | * | 3/1997 | Market | 174/53 |
| 5,653,414 A | * | 8/1997 | Chimel | 248/316.7 |
| 5,673,628 A | * | 10/1997 | Boos | 108/138 |
| 5,793,614 A | * | 8/1998 | Tollbom | 361/732 |
| 6,213,438 B1 | * | 4/2001 | Ostby et al. | 224/539 |
| 6,286,797 B1 | * | 9/2001 | Thaxton | 248/229.14 |

OTHER PUBLICATIONS

U.S. application Ser. No. 08/920,847 filed Aug. 29, 1997 having priority date Jun. 28, 1994, allowed Sep. 9, 1998.

* cited by examiner

Primary Examiner—Ramon O. Ramirez
Assistant Examiner—Jon Szumny

(57) ABSTRACT

A mounting platform having first and second frame members being slidably interconnected along a first direction, at least one of the first and second frame members including a device mounting surface positioned relative to the first direction; one or more clamping members coupled to each of the first and second frame members, each of the clamping members including a clamping surface being spaced above and inclined toward the device mounting surface; and a biasing member coupled between the first and second frame members for biasing the first and second frame members toward one another along the first direction.

33 Claims, 4 Drawing Sheets

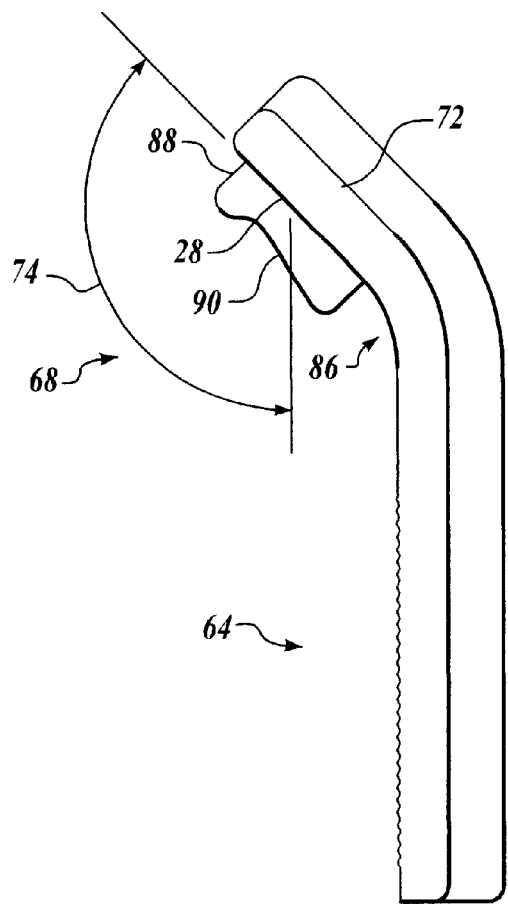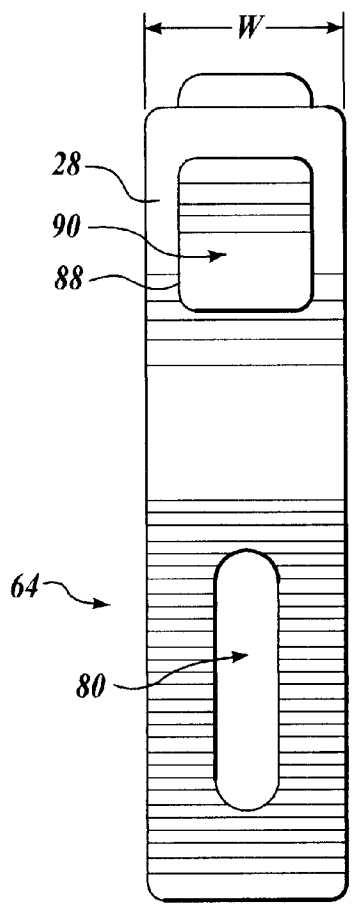
*Fig. 3D.*     *Fig. 3E.*

QUICK RELEASE ELECTRONICS PLATFORM

FIELD OF THE INVENTION

The present invention relates generally to trays for holding portable devices, and in particular to quick release trays for holding portable electronic devices, including lap top computers and other similarly sized electronics devices.

BACKGROUND OF THE INVENTION

Many after-market accessories being added in automobiles require specially designed mounting platforms that can accommodate the limited available space normally found in a vehicle for mounting add-on equipment. These mounting platforms must be able to handle the load of the accessory device in the vibration and shock environment encountered in a moving vehicle while still permitting the accessory device to be quickly and easily installed in the mounting platform. The mounting platform itself must be easily and quickly universally adjustable to provide maximum positional flexibility. The mounting platforms must also accommodate the various shapes of accessory devices being installed, while conforming to the limited, generally oddly-shaped space available in which to mount the platform and the accessory device. Various mounting platforms are currently in use of different configurations that mount either on the vehicle's center console or dash board.

Generally, the currently known mounting platforms tend to permit the accessory device to slip within the mounting platforms when vibration or shock-induced forces act on the accessory device during motion of the vehicle.

SUMMARY OF THE INVENTION

The present invention provides a mounting platform that overcomes the limitations of the prior art by providing a novel spring-loaded frame structure in combination with a novel clamping mechanism that securely, but gently, compresses an accessory device onto padded device mounting surfaces.

The present invention is an accessory device mounting platform that includes first and second frame members being slidably interconnected along a first direction, the first and second frame members each including a device mounting surface positioned relative to the first direction; a resilient biasing mechanism, such as a tension spring, being mechanically coupled between the first and second body portions for biasing the first and second body portions together along the first direction; and a plurality of clamping mechanisms coupled to the device mounting surfaces of the respective first and second frame members for compressing an external object onto the device mounting surfaces.

According to one embodiment of the invention, each clamping mechanism includes a substantially rigid, elongated base portion including structure for mounting on one of the first and second body portions adjacent to the respective device mounting surface; a substantially rigid, elongated jaw portion rigidly extending at a predetermined obtuse angle from one end of the elongated base portion, and a resilient, compressible pad mechanically fixed to a surface of the jaw portion positioned on an interior of the obtuse angle. One or more of the clamping mechanisms are coupled to each of the first and second body portions such that the surface of the jaw portion having the compressible pad fixed thereto projects above and inclines toward the respective first and second device mounting surface for compressing an external object between the jaw portion and the respective first and second device mounting surface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3D is a side view of the clamp member of the invention embodied in a simpler shape as compared with that shown in FIGS. 3A and 3B, wherein the clamp member is formed having a single bend between the base portion and the inclined clamping surface, but is otherwise substantially as shown in FIGS. 3A and 3B; and FIG. 3E is an end view of the alternative clamp member of the invention embodied as shown in FIG. 3D.

DETAILED DESCRIPTION OF PREFERRED EMBODIMENT

In the Figures, like numerals indicate like elements.

Figure 1:
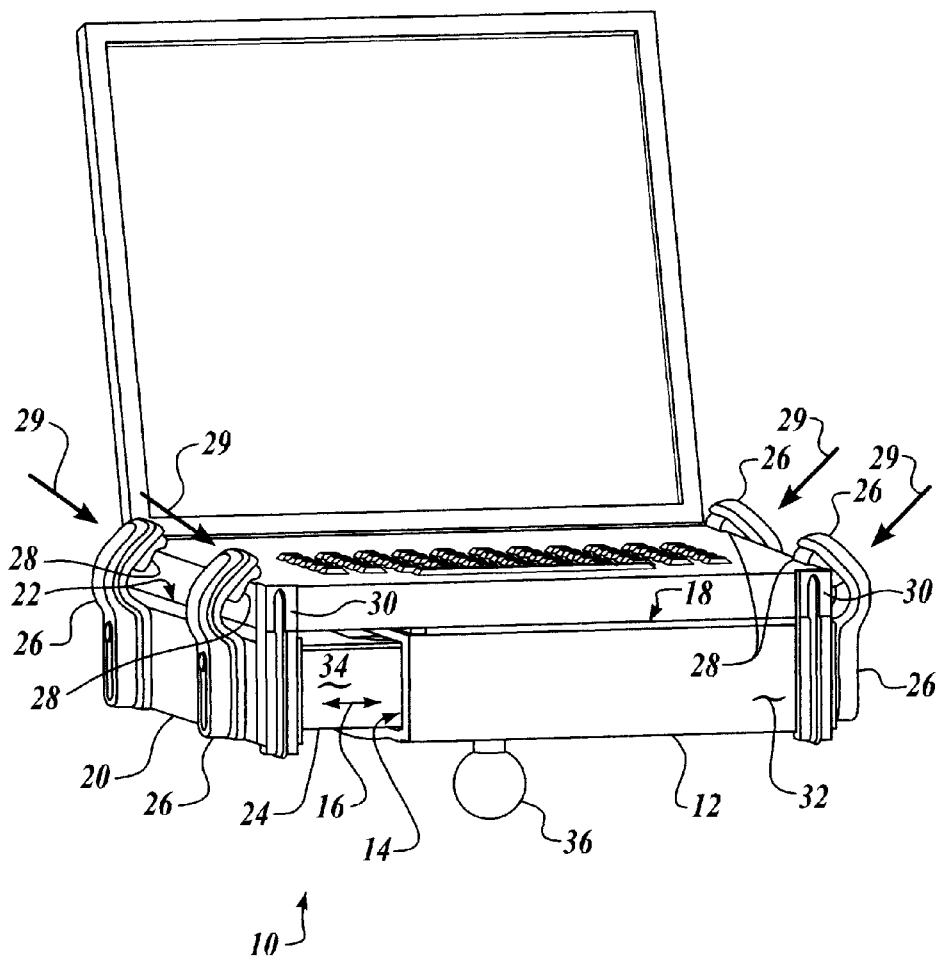
FIG. 1 shows the invention embodied as a platform for mounting in a vehicle various accessory devices, such as a portable computer (shown), a cellular telephone, a global positioning system (GPS) receiver, or another useful accessory device.
Figure 2:
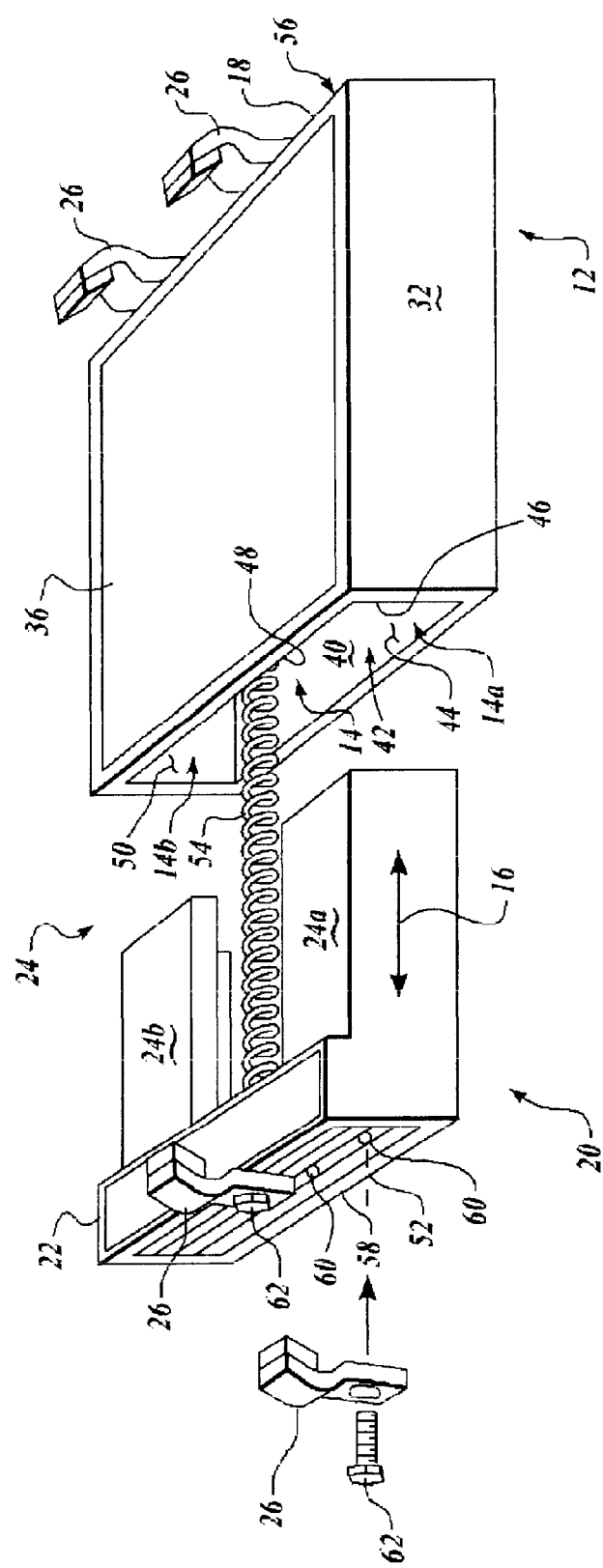
FIG. 2 is an exploded view of the mounting platform of the invention as shown in FIG. 1.

FIG. 1 illustrates the invention embodied as a mounting platform 10 for various vehicle-mounted, after-market accessory devices, such as a portable computer (shown), a cellular telephone, a global positioning system (GPS) receiver, or another useful accessory device. The mounting platform 10 includes a first frame or body portion 12 having an interior track 14 aligned along a first direction 16 and a first device mounting surface 18 adjacent to the track 14. A second frame or body portion 20 includes a second device mounting surface 22 adjacent to a slide 24 structured to slidably engage the track 14 along the first direction 16. A resilient member, shown in FIG. 2, is structured to engage each of the first and second body portions 12, 20 for urging the first and second body portions 12, 20 to approach one another along the first direction 16 when the slide 24 is slidably engaged with the track 14. At least one clamp member 26 is mounted on each of the first and second body portions 12, 20 in a manner projecting above the respective first and second device mounting surfaces 18, 22. Each clamp member 26 includes a clamping surface 28 facing toward the respective first and second body portions 12, 20 along the first direction 16 and being inclined relative to the respective first and second device mounting surfaces 18, 22. Multiple clamp members 26 are optionally provided, as shown, on one or both of the first and second body portions 12, 20.

As illustrated in FIG. 1, a substantially thin, flat base portion of the accessory device engages the first and second device mounting surfaces 18, 22 of the first and second body portions 12, 20. Thereafter, the inclined clamping surfaces 28 of the clamp members 26 engage opposing edges of an upper surface of the base portion of the accessory device that is spaced away from the device mounting surfaces 18, 22.

The resilient member urging the first and second body portions 12, 20 to approach one another along the first direction 16 simultaneously urges the clamp members 26 to approach one another along the first direction 16 such that the inclined clamping surfaces 28 press on the opposing edges of the base portion upper surface to compress the upper surface of the accessory device downwardly toward the device mounting surfaces 18, 22, as indicated by the arrows 29. The device mounting surfaces 18, 22 are equipped with a relatively high coefficient of friction that operates in combination with the pressure applied by the inclined clamping surfaces 28 of the clamp members 26 to limit slippage of the accessory device relative to the device mounting surfaces 18, 22.

Optionally, one or more stops 30 are fixed to respective side surfaces 32, 34 of the first and second body portions 12, 20 in a manner projecting above the respective first and second device mounting surfaces 18, 22. The optional stop or stops 30 are useful for positioning the accessory device relative to the device mounting surfaces 18, 22. Furthermore, the optional stop or stops 30 add protection against slippage of the accessory device relative to the device mounting surfaces 18, 22 when the device mounting surfaces 18, 22 are tilted so that gravity would urge the accessory device to slip off of the device mounting surfaces 18, 22.

A mounting structure 36 is positioned on one of the first and second body portions 12, 20 for engaging a mounting device (not shown) in or on the vehicle. The mounting structure 36 is, for example, the compressible coupling member portion of the universally positionable mounting device shown and described in U.S. Pat. No. 5,845,885 issued to the inventor of the present invention on Dec. 8, 1998, which is incorporated in its entirety herein by reference, and the mounting device is the one shown and described in therein. Alternatively, the mounting structure 36 is, for example, the geodesic coupler shown and described in application Ser. No. 09/855,171 entitled GEODESIC MOUNTING APPARATUS, filed in the name of the inventor of the present invention on May 14, 2001, which is incorporated in its entirety herein by reference, and the mounting device is the one shown and described in therein. Alternatively, the mounting structure 36 is another suitable structure of conventional design.

FIG. 2 is an exploded view of the mounting platform 10 as shown in FIG. 1. As shown in FIG. 2, a portion 38 of the first device mounting surface 18 of the first body portion 12 is equipped with a relatively high coefficient of friction. For example, the high friction portion 38 is a pad of material having a relatively high coefficient of friction. For example, a thin rubber sheet is adhered to the first device mounting surface 18, either with a suitable adhesive therebetween or using another conventional mechanical adhesion means. Alternatively, the high friction portion 38 is a sheet of conventional non-skid material, such as sand paper, adhered to the first device mounting surface 18. Optionally, the high friction portion 38 of the first device mounting surface 18 is formed with a grooved, knurled, serrated, slotted, or otherwise suitably roughened surface area in place of the rubber sheet or non-skid material.

The track 14 is shown in FIG. 2 embodied as a cavity 40 adjacent to the first device mounting surface 18. The cavity 40 includes an opening 42 thereinto and four interior planar surfaces 44, 46, 48, 50, each of the pairs of opposing interior surfaces 44, 48 and 46, 50 being mutually parallel and spaced apart and interconnected at the edges to the other respective pair. The four interior planar surfaces 44, 46, 48, 50 thus form two mutually parallel and spaced apart channel-shaped tracks 14a and 14b, the first channel-shaped track 14a being formed of the interior surface 46 and portions of the mutually parallel and spaced apart interior surfaces 44, 48 interconnected thereto at the edges, and the second channel-shaped track 14b being formed of the interior surface 50 and portions of the mutually parallel and spaced apart interior surfaces 44, 48 interconnected thereto at the edges.

The second body portion 20 is a drawer-like structure having the second device mounting surface 22 adjacent to the slide 24, which is embodied as a pair of slides 24a and 24b. The pair of slides 24a and 24b are structured to enter the cavity 40 in the first body portion 12 through the opening 42, and to slidably engage the tracks 14a and 14b, respectively, along the first direction 16. The pair of slides 24a and 24b are structured with sufficient stiffness or rigidity to support a portion of the weight of the accessory device on the second device mounting surface 22, while projecting in a cantilevered manner from the respective mating tracks 14a and 14b. The pair of slides 24a and 24b are optionally integrally formed with a base portion 52 and the second device mounting surface 22 formed thereon.

The slides 24a, 24b and tracks 14a, 14b are optionally formed differently from the embodiment shown in FIG. 2. For example, the slides 24a, 24b are optionally formed as rods or tubes that slidably engage tracks 14a, 14b formed as mating tubular structures. According to another embodiment of the invention, the track 14 and slide 24 structure is formed as a conventional telescoping rod-and-tube structure of a type that is well-known in the mechanical arts. Other mating track-and-slide structures are generally well-known and are considered to be equivalents of the track 14 and slide 24 structure shown.

FIG. 2 also illustrates the resilient member for urging the first and second body portions 12, 20 to approach one another along the first direction 16, wherein the resilient member is embodied as a spring 54. The spring 54 is a tension spring coupled by conventional means at opposing ends to appropriate structure formed on each of the first and second body portions 12, 20. When the track 14 and slide 24 structures of the first and second body portions 12, 20 are engaged, the first and second body portions 12, 20 can be separated by a force exerted along the first direction 16. The spring 54 resists the separating force by increasing the spring tension force and thereby urges the first and second body portions 12, 20 back together. The cooperating track 14 and slide 24 structures ensure that relative motion between the first and second body portions 12, 20 is limited to motion along the first direction 16.

As described above, the tension force of spring 54 also brings the clamp members 26 into engagement with opposing upper surface edges of the base portion of the accessory device that is placed on the device mounting surfaces 18, 22. The respective end faces 56, 58 of the first and second body portions 12, 20 are structured for mounting one or more of the clamp members 26. For example, the end faces 56, 58 are formed with apertures 60 sized to accept a fastener 62, such as a screw or bolt and nut combination, for mounting each of the one or more of the clamp members 26.

The respective end faces 56, 58 of the first and second body portions 12, 20 are optionally formed with a relatively high friction surface area, such as a grooved, knurled, diamond, serrated, slotted, or otherwise suitably roughened surface area, that provides purchase for the one or more clamp members 26. The high friction surface permits each of the clamp members 26 to be positioned on the respective end faces 56, 58 while removing any opportunity for them to shift position. Thus, once the clamp members 26 are positioned appropriately for the base portion of a particular accessory device, the first and second body portions 12, 20 can be separated and accessory device inserted and remove multiple times without readjustment of the clamp members 26.

Figure 3A:
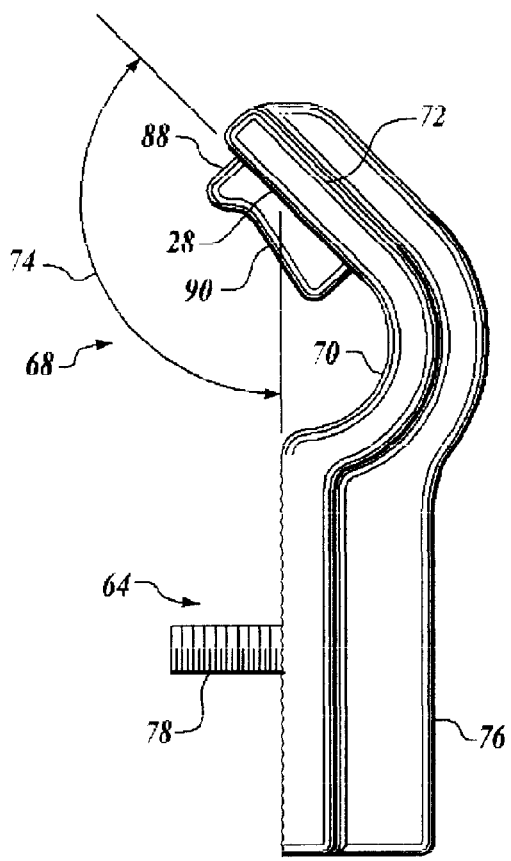
FIG. 3A is aside view of the clamp member of the invention as shown in FIGS. 1 and 2 embodied having an elongated finger with a crooked jaw portion extending therefrom and including an inclined clamping surface.
Figure 3B:
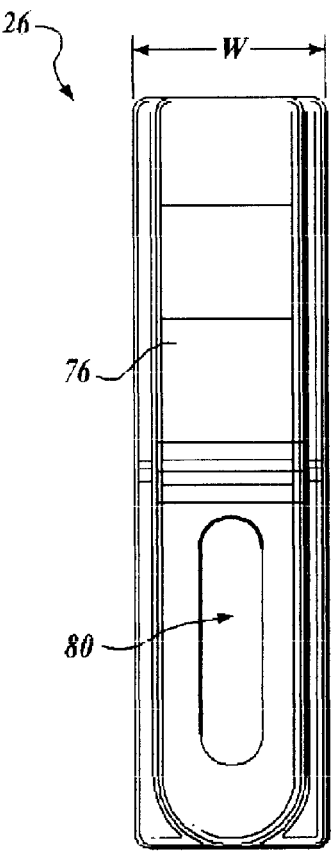
FIG. 3B is an end view of the clamp member of the invention as embodied in FIG. 3A.

FIGS. 3A and 3B illustrate the clamp member 26 as an elongated finger having a base portion 64 with a mounting surface 66 and a crooked jaw portion 68 extending therefrom. FIG. 3A is a side view of the clamp member 26, and FIG. 3B is an end view thereof. The jaw portion 68 includes a curved neck portion 70 extending from the base portion 64 into a short straight portion 72 having the inclined clamping surface 28 formed as facet thereof. The straight portion 72 is formed at an appropriate predetermined obtuse angle 74 to the base portion 64. The angle 74 is about 135 degrees according to one embodiment of the invention, but according to other embodiments of the invention can optionally vary +or −15 degrees or more. When the clamp member 26 is installed on the end faces 56, 58 of the first and second body portions 12, 20, the jaw portion 68 extends above the respective first and second device mounting surfaces 18, 22. The angle 74 positions the short straight portion 72 of the jaw portion 68 with the inclined clamping surface 28 facing inwardly and downwardly toward the respective first and second device mounting surfaces 18, 22. The angle 74 permits the jaw portions 68 to engage the upper edges of the accessory device along the entire length of the inclined clamping surface 28 so that devices having base portions of different thicknesses are easily accommodated, without adjustments in the positions of the clamp members 26 relative to the device mounting surfaces 18, 22.

Optionally, the mounting surface 66 of the base portion 64 of each clamp member 26 is embodied having a relatively high friction surface, such as a grooved, knurled, diamond, serrated, slotted, or otherwise suitably roughened surface area, that is configured to cooperate with the high friction surface area formed on the respective end faces 56, 58 to eliminate slippage of the clamp member 26 relative to the respective end faces 56, 58. According to one embodiment of the invention, the high friction mounting surface 66 is a grooved surface when the cooperating high friction surface area on the end faces 56, 58 of the respective body portions 12, 20 are grooved surfaces.

Additionally, each clamp member 26 is optionally embodied having a stiffener portion 76 extending along part or all of its length for strengthening the clamp member 26 in the plane of the first direction 16 in which the clamping surface 28 acts.

FIG. 3A also shows that the mounting surface 66 of the base portion 64 is optionally embodied with threaded stud 78 that passes through one of the apertures 60 (shown in FIG. 2), thereby replacing the fastener 62 for mounting the clamp member 26. Optionally, the apertures 60 are embodied as slots in the end faces 56, 58 of the body portions 12, 20, whereby the clamp member 26 is selectively positionable relative to the respective body portions 12, 20 by moving the threaded stud 78 to different positions within the slot 60. The clamp member 26 is captured and held in place by engagement of a nut (not shown) onto the threaded stud 78 after it is passed through the slot 60 and selectively positioned relative to one of the respective end faces 56, 58.

As shown in FIG. 3B, each clamp member 26 includes an aperture 80 sized to accept the fastener 62 for fixing the clamp member 26 to one of the end faces 56, 58. Optionally, the aperture 80 is embodied as a slot aligned with the length of the base portion 64 so that the clamp member 26 can be moved relative to the body portions 12, 20, whereby the jaw portion 68 is spaced further away from or closer to the first and second device mounting surfaces 18, 22. The optional ability to move the clamp member 26 relative to the body portions 12, 20 thus accommodates accessory devices with base portions having a wider range of thicknesses.

Figure 3C:
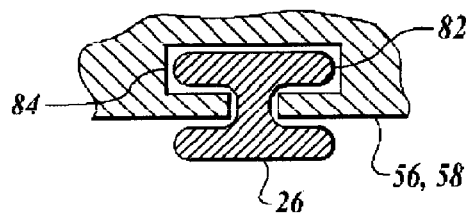
FIG. 3C shows a bottom end view of the clamp member of the invention alternatively embodied using a tongue-and-groove structure for mating with the respective body portions of the invention.

FIG. 3C shows a bottom end view of the clamp member 26 alternatively embodied using a tongue-and-groove structure for mating with the respective body portions 12, 20. For example, the clamp member 26 is formed with an optional T-shaped flange 82 for joining with a cooperating slot structure 84 formed in the end faces 56, 58. The clamp member 26 is thus capable of movement, i.e., adjustment, relative to the first and second device mounting surfaces 18, 22 for accommodating accessory devices with base portions having a wider range of thicknesses.

FIG. 3D shows the clamp member 26 embodied in a simpler shape having a single bend 86 between the base portion 64 and the short straight portion 72 of the jaw portion 68, but is otherwise substantially as described above. The single bend 86 is formed at the appropriate predetermined angle 74, which is again about 135 degrees according to one embodiment of the invention. The short straight portion 72 of the jaw portion 68 is positioned by the angle 74 to face inwardly and downwardly toward the respective device mounting surfaces 18, 22, and permits the jaw portion 68 to engage accessory devices having base portions of different thicknesses, without adjustments in the positions of the clamp members 26 relative to the device mounting surfaces 18, 22.

FIG. 3E is an end view of the alternative clamp member 26 shown in FIG. 3D and shows the high friction mounting surface 66 of the base portion 64 as a grooved surface that is interrupted by the slot 80.

The clamp member 26 as shown in FIGS. 3A through 3E is formed with an optional width W that can be as to merely accommodate a single slot 80 or T-shaped flange 82 and a minimal amount of material on either side thereof. However, the invention also contemplates a clamp member 26 having an optionally greater width W that, for example, is contiguous with a large portion or substantially all of the width of the end faces 56, 58 of the respective body portions 12, 20 and accommodates multiple slots 80 or T-shaped flanges 82. Thus, all such optional structures are considered to be equivalents of the clamp member 26 of the invention.

The clamp member 26 includes the inclined clamping surface 28, which is rotated at the angle 74 from the base portion 64, as described above. The inclined clamping surfaces 28 includes a portion 88 that is equipped with a relatively high coefficient of friction so that the clamping surface 28 grips the edge of the accessory device, rather than just compressing the accessory device into the device mounting surfaces 18, 22. For example, the high friction portion 88 is a pad of material having a relatively high coefficient of friction, such as a thin sheet of rubber or conventional non-skid material adhered to the inclined clamping surface 28. Optionally, the high friction portion 88 is formed with a grooved, knurled, serrated, slotted, or otherwise suitably roughened surface area in place of the rubber sheet or non-skid material.

According to one embodiment of the invention, the high friction portion 88 is embodied as a resilient cushion or pressure pad formed of an elastomeric material, such as rubber or a synthetic substitute. The pressure pad 88 is formed having a thickness and durometer that permits it to be compressed against the edge of the accessory device while remaining elastic. The pressure pad 88 thus operates as a spring compressed between the clamping surface 28 and the accessory device to maintain a substantial spring pressure against the accessory device. This spring pressure operates to press the press the accessory device against the device mounting surfaces 18, 22, thereby further limiting slippage of the device resulting from the jarring experienced during motion of the vehicle.

The pressure pad 88 optionally includes a contact surface 90 that is equipped with a relatively high coefficient of friction so that the pressure pad 88 grips the edge of the accessory device, rather than just compressing the accessory device into the device mounting surfaces 18, 22. For example, the high friction contact surface 90 is formed with a grooved, knurled, serrated, slotted, or otherwise suitably roughened surface area or is covered with a thin sheet of rubber or another non-skid material.

While the preferred embodiment of the invention has been illustrated and described, it will be appreciated that various changes can be made therein without departing from the spirit and scope of the invention.

I claim:

1. A mounting platform, comprising:
    first and second frame members being slidably interconnected along a first direction, at least one of the first and second frame members including a device mounting surface positioned relative to the first direction;
    one or more clamping members coupled to each of the first and second frame members, each of the clamping members including:
        a base portion structured for mounting on a surface of one of the first and second frame members,
        a clamping surface being spaced above and inclined toward the device mounting surface, and
        a jaw portion extending from the base portion at an angle between approximately 120 ions and 150 degrees, the clamping surface being formed as a facet of the jaw portion; and
        a biasing member coupled between the first and second frame members for biasing the first and second frame members toward one another along the first direction.

2. The mounting platform of claim 1, wherein the frame member that includes a device mounting surface further comprises a mounting structure coupled to a surface thereof, the mounting structure being structured for coupling with a mounting device that is exclusive of the mounting platform.

3. The mounting platform of claim 2, wherein the mounting structure is coupled to a surface of the frame member that is opposite from the device mounting surface.

4. The mounting platform of claim 1, wherein the biasing member is a tension spring.

5. The mounting platform of claim 1, wherein each of the first and second frame members includes a device mounting surface, and the respective device mounting surfaces are substantially planar surfaces that are relatively positioned for substantially coplanar motion.

6. The mounting platform of claim 1, wherein the first and second frame members include cooperating track-and-slide members that are structured to operate along the first direction.

7. The mounting platform of claim 1, wherein the device mounting surface includes a portion that exhibits a relatively high coefficient of friction.

8. The mounting platform of claim 7, wherein the portion of the device mounting surface that exhibits a relatively high coefficient of friction further comprises a sheet of material adhered to the device mounting surface.

9. The mounting platform of claim 8, wherein the sheet of material is one of a natural and a synthetic rubber-type material.

10. The mounting platform of claim 1, wherein the clamping surface includes a portion that exhibits a relatively high coefficient of friction.

11. The mounting platform of claim 10, wherein the portion of the clamping surface that exhibits a relatively high coefficient of friction further comprises one of a thin sheet of rubber and a conventional non-skid material adhered to the clamping surface.

12. The mounting platform of claim 10, wherein the portion of the clamping surface that exhibits a relatively high coefficient of friction further comprises a resilient cushion formed of an elastomeric material.

13. A The mounting platform of claim 12, wherein the jaw portion of each of the one or more clamping members includes a curved neck portion extending between the base portion and a substantially straight portion extending at the predetermined angle from the base portion and having the clamping surface formed as facet thereof.

14. A mounting platform comprising:
    a first body portion having a track that is aligned along a first direction and a first device mounting surface adjacent to the track;
    a second body portion having a slide that is structured to slidably engage the track for relative motion along the first direction and a second device mounting surface adjacent to the slide;
    a resilient biasing mechanism that is mechanically coupled between the first and second body portions for biasing the first and second body portions together along the first direction; and
    a plurality of clamping mechanisms, each clamping mechanism including:
        a substantially rigid, elongated base portion including structure for mounting on one of the first and second body portions adjacent to the first and second device mounting surfaces,
        a substantially rigid, elongated jaw portion extending at an obtuse angle of between approximately 120 and 150 degrees from one end of the elongated base portion, and
        a resilient compressible pad mechanically fixed to a surface of the jaw portion positioned on an interior of the obtuse angle, one or more of the clamping mechanisms being coupled to each of the first and second body portions such that the surface of the jaw portion having the resilient compressible pad fixed thereto projects above and inclines toward the respective first and second device mounting surface for compressing an external object between the jaw portion and the respective first and second device mounting surface.

15. The mounting platform of claim 14, wherein the resilient biasing mechanism is a tension spring.

16. An accessory device mounting platform, comprising:
    a first body portion having a first device mounting surface interconnected to a track that is aligned along a first direction and;

a second body portion having a second device mounting surface interconnected to a slide that is structured to slidably engage the track for relative motion along the first direction;

an elastic biasing member engaged with each of the first and second body portions for urging the second body portion to approach the first body portion along the first direction;

a clamp member including a base portion and a jaw portion extending at an angle between approximately 120 and 150 degrees therefrom and having a clamping surface formed as a facet thereof, one or more of the clamp members mounted on each of the first and second body portions such that the clamping surface projects above and faces toward the respective first and second body portion along the first direction and being inclined toward the respective first and second device mounting surface.

17. The mounting platform of claim 16, further comprising a mounting structure positioned on one of the first and second body portions for mechanically engaging a mounting device.

18. The mounting platform of claim 17, wherein the mounting structure is positioned on a surface of one of the first and second body portions opposite from the device mounting surface.

19. The mounting platform of claim 17, wherein the biasing member is a resilient biasing member.

20. The mounting platform of claim 19, wherein the resilient biasing member is a tension spring.

21. A mounting device, comprising:
a clamping mechanism, comprising:
a substantially rigid base portion including a mounting structure for mounting on an external member,
a substantially rigid jaw portion extending at an obtuse angle from one end of the base portion, and
a resilient compressible pad fixed to a surface of the jaw portion positioned on an interior of the obtuse angle;
first and second frame members slidably interconnected for relative motion along a first direction, one of the first and second frame members including a device mounting surface positioned relative to the first direction and a clamp mounting surface formed relative to the device mounting surface, the clamp mounting surface being structured to cooperate with the mounting structure of the clamping mechanism for positioning the resilient compressible pad spaced away from and inclined toward the device mounting surface; and
a biasing member mechanically coupled between the first and second frame members for biasing the first and second frame members together along the first direction.

22. The clamping mechanism of claim 21, wherein the jaw portion further comprises an elongated, substantially planar portion and a curved neck portion extending between the base portion and the elongated planar portion, the elongated, substantially planar portion including the surface to which the resilient compressible pad is fixed.

23. The clamping mechanism of claim 21, wherein the resilient compressible pad is formed of an elastomer.

24. The clamping mechanism of claim 21, wherein the elongated base portion further comprises a surface positioned on an interior of the angle and having a relatively high coefficient of friction.

25. The clamping mechanism of claim 24, wherein the surface having a relatively high coefficient of friction is formed having one of a grooved, a knurled, a diamond, a serrated, a slotted, and a roughened surface.

26. The clamping mechanism of claim 21, wherein the structure for mounting of the elongated base portion further comprises a slotted aperture formed therethrough.

27. A clamping mechanism, comprising:
a substantially rigid, elongated base portion including structure for mounting on an external member;
a substantially rigid, elongated jaw portion extending at a predetermined obtuse angle from one end of the elongated base portion;
a resilient compressible pad mechanically fixed to a surface of the jaw portion positioned on an interior of the obtuse angle; and
a mounting platform, including:
first and second frame members being slidably interconnected for relative motion along a first direction, one of the first and second frame members including a device mounting surface positioned relative to the first direction and a clamp mounting surface formed relative to the device mounting surface, the clamp mounting surface being structured to cooperate with the mounting structure of the clamping mechanism for positioning the resilient compressible pad spaced away from and inclined toward the device mounting surface; and
a biasing member being mechanically coupled between the first and second frame members for biasing the first and second frame members together along the first direction.

28. The clamping mechanism of claim 27, wherein each of the first and second frame members includes a clamp mounting surface, and further comprising one or more of the clamping mechanisms mounted on each clamp mounting surface.

29. The clamping mechanism of claim 28, wherein each of the first and second frame members includes a device mounting surface positioned relative to the first direction.

30. The clamping mechanism of claim 27, wherein the predetermined obtuse angle at which the jaw portion extends from one end of the elongated base portion is an angle between about 120 and about 150 degrees.

31. The clamping mechanism of claim 27, wherein each of the clamp mounting surface and the base portion of the clamping mechanism are formed with cooperating anti-slippage structures.

32. The clamping mechanism of claim 31, wherein the cooperating anti-slippage structures are selected from a group of anti-slippage structures made up of a grooved, a knurled, a diamond, a serrated, a slotted, and a roughened surface area.

33. A mounting platform, comprising:
first and second frame members being slidably interconnected along a first direction, at least one of the first and second frame members including a device mounting surface positioned relative to the first direction;
one or more clamping members coupled to each of the first and second frame members, each of the clamping members including a clamping surface being spaced above and inclined toward the device mounting surface and comprising a resilient cushion formed of an elastomeric material that exhibits a relatively high coefficient of friction, wherein each of the one or more clamping members includes a base portion structured for mounting on a surface of one of the first and second frame members, and a jaw portion formed as a curved neck portion extending between the base portion and a substantially straight portion extending at an angle between approximately 120 and 150 degrees from the base portion and having the clamping surface formed as facet thereof; and a biasing member coupled between the first and second frame members for biasing the first and second frame members toward one another along the first direction.

* * * * *

UNITED STATES PATENT AND TRADEMARK OFFICE
CERTIFICATE OF CORRECTION

PATENT NO.   : 6,585,212 B2
DATED        : July 1, 2003
INVENTOR(S)  : Jeffrey D. Carnevali It is certified that error appears in the above-identified patent and that said Letters Patent is hereby corrected as shown below:

Column 7,
Line 30, claim 1 should read:
-- 1. A mounting platform, comprising:

first and second frame members being slidably interconnected along a first direction, at least one of the first and second frame members including a device mounting surface positioned relative to the first direction;

one or more clamping members coupled to each of the first and second frame members, each of the clamping members including:

a base portion structured for mounting on a surface of one of the first and second frame members, a clamping surface being spaced above and inclined toward the device mounting surface, and a jaw portion extending from the base portion at an angle between approximately 120 and 150 degrees, the clamping surface being formed as a facet of the jaw portion; and a biasing member coupled between the first and second frame members for biasing the first and second frame members toward one another along the first direction. --

Signed and Sealed this

Twenty-eighth Day of June, 2005

JON W. DUDAS
*Director of the United States Patent and Trademark Office*